May 20, 1924. 1,494,358
C. W. HINMAN
CALORIMETER
Filed March 29, 1922
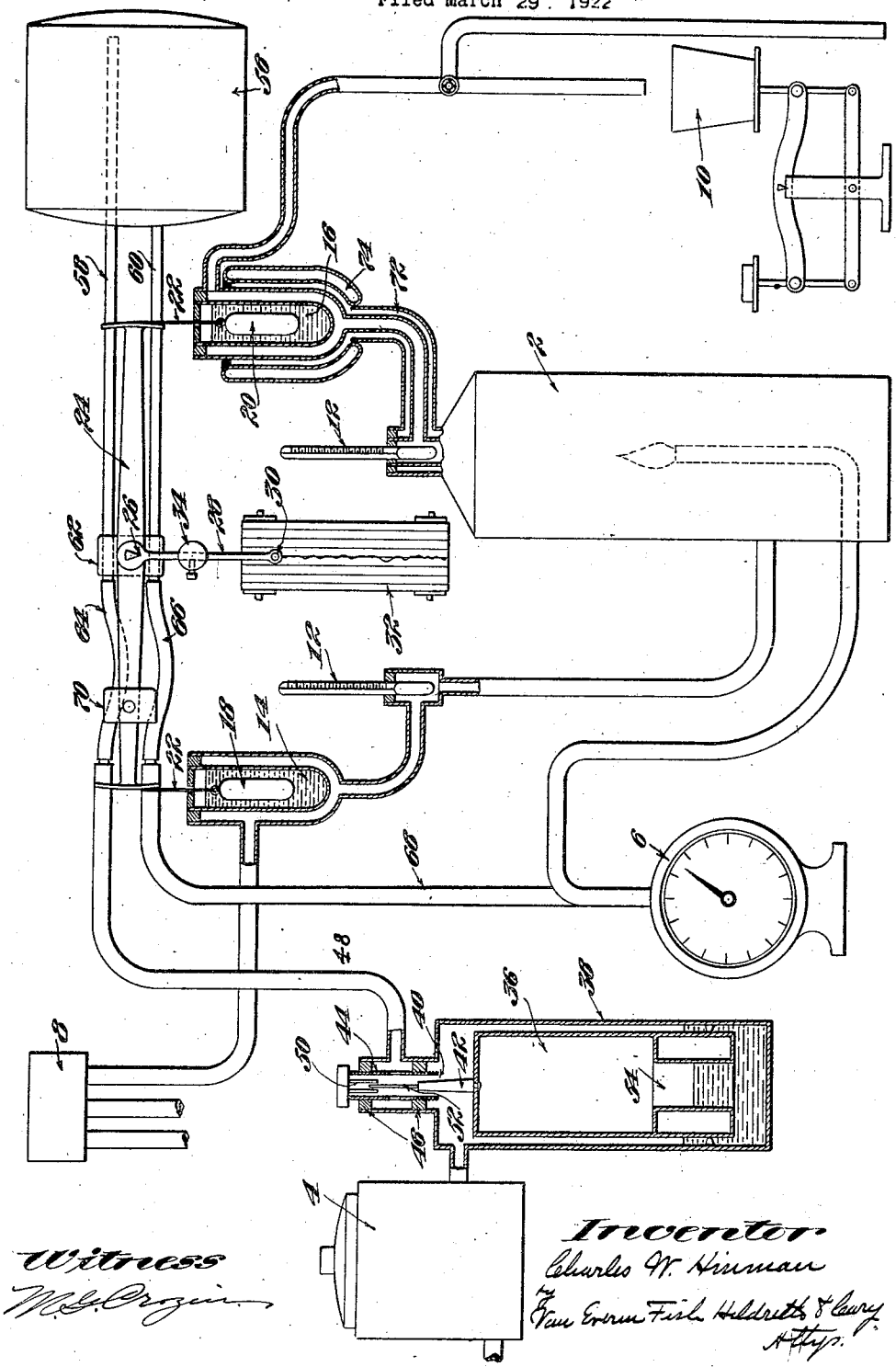

Patented May 20, 1924.

1,494,358

UNITED STATES PATENT OFFICE.

CHARLES W. HINMAN, OF WINCHESTER, MASSACHUSETTS; NATHANIEL C. NASH, JR., EXECUTOR OF SAID CHARLES W. HINMAN, DECEASED, ASSIGNOR TO NATHANIEL C. NASH, JR., TRUSTEE.

CALORIMETER.

Application filed March 29, 1922. Serial No. 547,708.

*To all whom it may concern:*

Be it known that I, CHARLES W. HINMAN, a citizen of the United States, residing at Winchester, in the county of Middlesex and State of Massachusetts, have invented certain new and useful Improvements in Calorimeters; and I do hereby declare the following to be a full, clear, and exact description of the invention, such as will enable others skilled in the art to which it appertains to make and use the same.

The invention relates to apparatus for measuring and recording the thermal value of gas and its object is to provide an apparatus which is well adapted for accurately indicating and recording the thermal value of the gas being produced in gas plants.

To this end one feature of the invention contemplates the provision in an apparatus including a flow calorimeter and means for recording the thermal value of the gas burned therein of means for correcting or compensating for variations in atmospheric temperature or pressure. This correction is preferably effected by utilizing means for regulating the flow of gas under a uniform pressure above atmospheric to compensate or correct for variations in atmospheric pressure and temperature. For instance, an increase in the barometric pressure of the atmosphere or a decrease in the temperature will increase the density of the gas and therefore will tend to decrease the amount of gas which will flow through the apparatus under a uniform pressure above atmospheric. To compensate or correct for this condition a regulating device is utilized between the calorimeter and the uniform pressure device which decreases the resistance to the flow of gas upon an increase in its density due to changes in atmospheric pressure or temperature and increases the resistance to its flow upon a decrease in its density due to such changes.

A further feature of the invention contemplates the provision of means for compensating or correcting for variations which may occur in the specific gravity of the gas flowing to the calorimeter. This correction is preferably effected by modifying the action of the recording mechanism in accordance with variations in the specific gravity of the gas flowing to the calorimeter.

A further feature of the invention contemplates the provision of recording mechanism which is operated by the variations in the temperature of the water before and after it passes through the calorimeter.

The features of the invention will be readily understood from an inspection of the accompanying drawings and the following detailed description of the apparatus illustrated therein. The figure of the drawing shows diagrammatically an apparatus embodying the invention in its preferred form.

The apparatus shown comprises a flow calorimeter of the usual well known construction which is indicated at 2, a pressure regulating device 4 of usual and well known construction for maintaining a uniform pressure above atmospheric, a meter 6 for indicating the rate of flow of the gas to the calorimeter, a pressure tank 8 of usual construction for maintaining a constant and uniform flow of water through the calorimeter and the usual weighing apparatus 10 for collecting and weighing the water passing through the calorimeter during the burning of a pre-determined amount of gas indicated by the meter in making a test of the thermal value of the gas burned. The calorimeter is provided with the usual thermometers 12, one of which indicates the temperature of the entering water before it has been subjected to the heat generated by the burning gas, and the other of which indicates the temperature of the water after it has absorbed the heat generated by the burning gas. As thus far described the apparatus is or may be of usual and well known construction.

In applying the present invention to the apparatus above indicated a mechanism is provided for indicating or indicating and recording the thermal value of the gas delivered to the calorimeter which is operated through the variation between the temperature of the water entering and the temperature of the water leaving the calorimeter. As shown this mechanism comprises a liquid containing chamber 14 surrounded by and maintained at the temperature of the water flowing to the calorimeter and a second liquid containing chamber 16 which is surrounded by and maintained at the temperature of the water flowing from the calorimeter. Bodies 18 and 20 of equal volume are submerged in the liquid in the two chambers and are connected as by wires 22 to the arms of a balance 24 at equal distances from the fulcrum 26. The balance is provided with a depending arm 28 carrying a stylus or marker 30 for indicating on a clock driven travelling chart 32 the position of the balance under the influence of the submerged bodies 18 and 20. Since the bodies 18 and 20 are of equal volume any change in the temperature difference between the two chambers and consequently change in the specific gravity difference between the liquids in the chambers will cause a movement of the balance which is proportional to such change, while equal rise or fall in the temperature of both bodies of liquid will have no effect. By proper calibration and adjustment of the weight 34 on the arm 28 and of the other parts of apparatus the stylus may be made to indicate on the chart the thermal value of the gas and also any variations in the thermal value.

Since changes in the density of the gas due to changes in atmospheric temperature and pressure, and changes in the specific gravity of the gas, due for instance to variations in its manufacture, would modify the operation of the calorimeter and recording mechanism as thus far described so that the thermal value per standard foot of gas would not be indicated and recorded means is provided for correcting or compensating for changes in temperature and pressure and for changes in the specific gravity of the gas. It is preferred to correct or compensate for changes in atmospheric temperature and pressure by regulation of the flow of gas and to correct or compensate for changes in the specific gravity of the gas by modifying the effect upon the recording mechanism of the heat generated by the burning of the gas.

The means shown for compensating for changes in atmospheric pressure and temperature consists of an inverted bell 36, the open lower end of which is immersed in a suitable liquid in the bottom of the chamber 38 within which the bell is arranged for vertical movement. The chamber 38 is arranged in the line of piping which leads from the constant pressure device 4 to the calorimeter 2 so that the gas flowing from the constant pressure device to the calorimeter passes through the chamber. In passing from the chamber the gas passes through a port 40 within which is arranged a conical regulating valve 42 connected with the bell 36 so that the area of the port is varied in accordance with the vertical position of the bell and valve. The port 40 is formed by the lower end of a screw threaded sleeve 44 which passes down through supports 46 formed at the upper end of the chamber 38 and may be adjusted vertically to properly adjust the area of the port 40. The sleeve is provided with openings between the supports 46 through which the gas flows to the pipe 48 leading to the calorimeter. The sleeve and upper end of the valve 42 may be provided with cooperating guides 50 and 52 for guiding the upper end of the bell 36. The bell is supported by the air or gas confined therein above the surface of the liquid in which the lower end of the bell is immersed.

Any change in atmospheric temperature or pressure will result in a change in the volume of the air or gas enclosed within the bell with a resulting change in its vertical position in the liquid and within the chamber 38. Any change in the vertical position of the bell will vary the position of the conical valve 42 within the lower end of the sleeve 44 and thus vary the size of the port 40 and the resistance offered to the flow of gas therethrough. A decrease in pressure or an increase in temperature will increase the volume of the gas or air within the bell 36 so that the bell will rise in the liquid and increase the resistance to the flow of gas from the constant pressure device to the calorimeter. Upon a decrease in the volume of the gas or air within the bell 36 due to an increase in pressure or a decrease in temperature the bell will move downward and thus decrease the resistance to the flow of the gas from the constant pressure device to the calorimeter. The flow of gas will thus be regulated to compensate or correct for variations in atmospheric temperature and pressure. The opening through that part of the lower end of the bell which enters the liquid in the chamber 38 may be substantially smaller in cross sectional area than the bell as indicated at 54 to increase the vertical movement of the bell due to a given change in the volume of the gas therein.

The mechanism for correcting or compensating for variations in the specific gravity of the gas flowing from the constant pressure device to the calorimeter comprises a gas holding chamber 56 so connected to the balance 24 that a change in the weight of the gas therein tends to counteract the effect upon the balance of a change in the rate of flow due to a change in specific gravity. For instance, an increase in the specific gravity of the gas will tend to decrease the flow to the calorimeter and thus decrease the heat generated by the burning gas with a resulting reduction in the temperature and increase in the specific gravity of the liquid in the chamber 16. The weight of liquid displaced by the submerged body 20 will, therefore, increase with a resulting tendency for the body to move upward. The gas holding chamber 56 is so connected with the balance and is so proportioned, however, that the increase in the weight of the gas in the chamber due to its increase in specific gravity will counteract the effect which such change would otherwise have on the balance and recording mechanism due to the decreased flow of gas and heat generated. As shown the gas holding chamber 56 is supported on pipes 58 and 60 extending from a head 62 secured to the balance 24 near its fulcrum. The pipe 58 through which the gas flows to the chamber 56 is connected to the pipe 48 by a flexible pipe 64 and the pipe 60 through which the gas flows from the chamber 56 to the calorimeter is connected by a flexible pipe 66 with the pipe 68 leading to the meter 6. The weight of the chamber 56 may be counter-balanced by a weight 70 on the opposite side of the fulcrum for the balance and this weight may be adjusted in setting and calibrating the recording mechanism to co-operate with the calibrated chart 32 in indicating the thermal value of the gas delivered to the apparatus. While it is preferred to include the chamber 56 in the conduit through which the gas flows from the constant pressure device to the calorimeter as shown this arrangement is not essential since the result accomplished will be the same whatever disposal is made of the gas after passing through the chamber provided the gas passing therethrough is the same as that burned in the calorimeter. For instance, the gas may be led to the chamber from any point between the constant pressure device and the device for regulating the flow of gas to the calorimeter to compensate for variations in temperature and pressure in case the gas is not to be burned in the calorimeter.

The piping leading from the calorimeter will be protected by any suitable heat insulation indicated generally at 72 and the chamber may be further insulated by a surrounding vacuum chamber indicated at 74.

The parts and mechanisms of the apparatus may be properly calibrated and adjusted so that the stylus 30 will indicate and record upon a properly calibrated and scaled chart the thermal value of the gas corrected for variations in temperature and pressure and for variations in specific gravity and expressed in B. t. u. per standard cubic foot.

While it is preferred to utilize an apparatus having substantially the construction and mode of operation indicated in the diagram it will be understood that the specific construction and arrangement of parts shown and described is not essential and may be varied and modified as may be found desirable or best suited to meet the practical and commercial requirements of the apparatus and to meet the conditions under which it may be installed or used.

What is claimed is:

1. An apparatus for measuring the thermal value of gas comprising a flow calorimeter, a recording mechanism therefor, a constant pressure device through which the gas flows to the calorimeter, means responsive to variations in temperature and pressure for modifying the flow of gas to the calorimeter to compensate for such variations, and means responsive to variations in the specific gravity of the gas flowing to the calorimeter for modifying the operation of the calorimeter to compensate for such variations.

2. An apparatus for measuring the thermal value of gas comprising a flow calorimeter, a recording mechanism therefor, a constant pressure device through which the gas flows to the calorimeter, and means responsive to variations in temperature and pressure for regulating the flow of gas to the calorimeter in accordance with such variations.

3. An apparatus for measuring the thermal value of gas comprising a flow calorimeter, a recording mechanism therefor, a constant pressure device through which the gas flows to the calorimeter, and means operated by changes in temperature and pressure of the gas for varying the resistance to the flow of gas to the calorimeter.

4. An apparatus for measuring the thermal value of gas comprising a flow calorimeter, a recording mechanism therefor, a constant pressure device through which the gas flows to the calorimeter, means operated by changes in the specific gravity of the gas flowing to the calorimeter for acting on a recording mechanism to counteract the effect of said changes upon the calorimeter.

5. An apparatus for measuring the thermal value of gas comprising a flow calorimeter, a recording mechanism therefor, a constant pressure device through which the gas flows to the calorimeter, a chamber between the calorimeter and constant pressure device through which the gas flows, an inverted bell within the chamber, the lower end of which is immersed in a liquid in the bottom of the chamber, and a regulating valve connected to move with the bell for varying the resistance to the flow of the gas in accordance with changes in the volume of the gas confined within the bell.

6. An apparatus for measuring the thermal value of gas comprising a flow calorimeter, a constant pressure device through which the gas flows to the calorimeter, a recording mechanism comprising a balance operated by the temperature difference between the fluid flowing to and the fluid flowing from the calorimeter, and a gas holding chamber through which the gas passes connected with the balance to counteract the effect on the balance of changes due to variations in the specific gravity of the gas burned in the calorimeter.

7. An apparatus for measuring the thermal value of gas comprising a flow calorimeter, a liquid containing chamber, means for maintaining the liquid in the chamber at the temperature of the fluid flowing to the calorimeter, a liquid containing chamber, means for maintaining the liquid in the chamber at the temperature of the fluid flowing from the calorimeter, bodies of equal volume submerged in the liquids in the chambers, a balance to the arms of which the bodies are connected at equal distances from the fulcrum, a stylus connected to move with the balance, and a travelling chart on which the stylus indicates the position and movements of the balance.

8. An apparatus for measuring the thermal value of gas comprising a flow calorimeter, a liquid containing chamber, means for maintaining the liquid in the chamber at the temperature of the fluid flowing to the calorimeter, a liquid containing chamber, means for maintaining the liquid in the chamber at the temperature of the fluid flowing from the calorimeter, bodies of equal volume submerged in the chambers, a balance to the arms of which the bodies are connected at equal distances from the fulcrum, a stylus connected to move with the balance, a travelling chart on which the stylus indicates the position and movements of the balance, and a gas holding chamber through which gas passes mounted on the balance to compensate for changes in the specific gravity of the gas burned in the calorimeter.

9. An apparatus for measuring the thermal value of gas comprising a flow calorimeter, a constant pressure device through which the gas flows to the calorimeter, a chamber between the constant pressure device and the calorimeter through which the gas flows, an inverted bell within the chamber, the lower end of which is immersed in a liquid in the lower end of the chamber to confine a body of gas within the bell, a regulating valve connected to move vertically with the bell to vary the resistance to the flow of the gas in accordance with changes in the volume of the gas within the bell due to variations in temperature and pressure, two liquid containing chambers, one of which is maintained at the temperature of the fluid flowing to, and the other of which is maintained at the temperature of the fluid flowing from the calorimeter, bodies of equal volume submerged in the liquids in the chambers, a balance to the arms of which the bodies are connected at equal distances from the fulcrum, a stylus connected to move with the balance, a travelling chart on which the stylus records the position and movements of the balance, a gas holding chamber through which the gas flows from the constant pressure device connected with the balance to modify the effect thereon of changes in the specific gravity of the gas burned in the calorimeter.

CHARLES W. HINMAN.